UNITED STATES PATENT OFFICE.

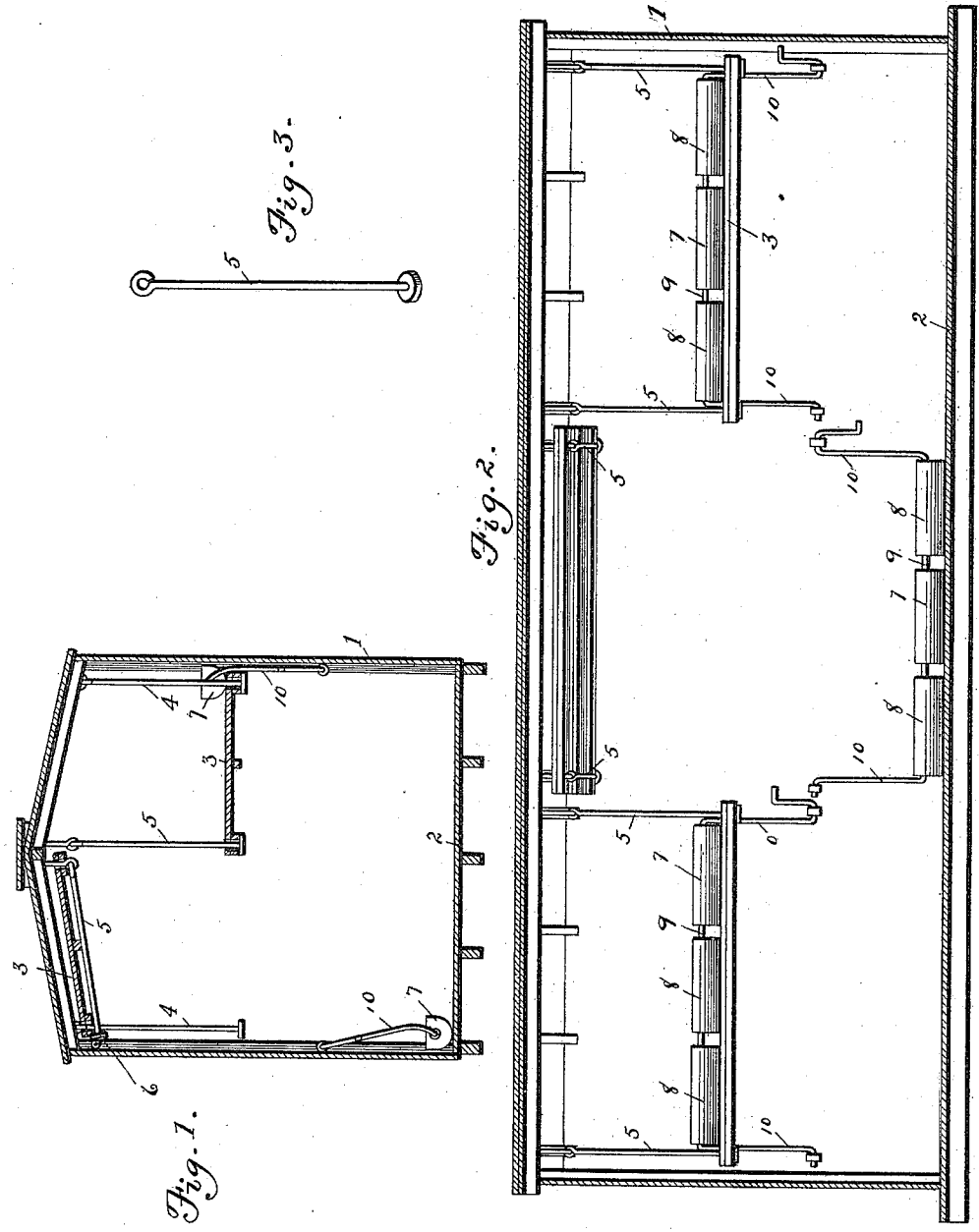

CHARLIE J. STRAM, OF WATERMAN, ILLINOIS.

ADJUSTABLE DOUBLE-DECK STOCK-CAR.

SPECIFICATION forming part of Letters Patent No. 600,750, dated March 15, 1898.

Application filed June 23, 1897. Serial No. 641,936. (No model.)

*To all whom it may concern:*

Be it known that I, CHARLIE J. STRAM, of Waterman, in the county of De Kalb and State of Illinois, have invented certain new and useful Improvements in Adjustable Double-Deck Stock-Cars; and I do hereby declare the following to be a full, clear, and exact description of the invention, such as will enable others skilled in the art to which it appertains to make and use the same.

This invention relates to double-deck stock-cars.

The purpose of the invention is to provide a stock-car which may be readily converted from a car with a single floor for cattle to what is called a "double-deck" car, having two floors for sheep, swine, or like small animals.

The invention consists in certain combinations hereinafter particularly described and claimed.

In the drawings forming part of this specification, Figure 1 is a transverse section through a car, showing one section of the adjustable floor in a raised position against the roof of the car and another section adjusted for use, a watering-trough being also shown in section. Fig. 2 is a longitudinal section of a car, showing one of the movable sections or supplemental floor in position for use and the others raised against the roof of the car, as in Fig. 1. In this section a side elevation of a watering-trough and means whereby it may be adjusted to the level of either floor are shown in elevation. Fig. 3 is a detail showing one of a series of suspending rods or links.

1 is an ordinary cattle-car having a main floor 2 and supplemental adjustable floor 3. The adjustable floor for each car is preferably made in six sections, three on each side of the center line of the car. Each section is suspended, supported, and guided on the side next the wall of the car by means of rods 4 and by a link or rod 5, hooked or jointed to the roof of the car, as shown. The adjustable floor-sections are perforated to slide up and down upon the rods 4 and 5, and the rod 5 is jointed sufficiently far from the roof to permit the floor-section to extend above the joint, and thus permit of the use of rod 5 as a support to hold the floor-section against the roof by its being turned to a horizontal position and interlocked with the hook 6, arranged in the side of the car. The adjustable floor-sections are readily adjusted up and down by means of cord or pulleys or any suitable hoisting-tackle.

7 is a watering-trough consisting of a series of receptacles or buckets 8, attached to and swiveled upon a metallic bar 9, provided with crank ends 10, the cranks being connected to the side of the car, so that they may be turned one-half the way around and thus permit the buckets or troughs to rest on the bottom or main floor or be carried up by the crank-arms 10 to the level of the adjustable floor and thereon supported.

Having thus described the invention, what I claim as new, and desire to secure by Letters Patent, is—

1. In a car having an ordinary permanent main floor, the combination with such car of an adjustable floor, rigid suspending and lateral holding-rods next the side of the car, jointed suspending-rods near the middle of the car, and hooks or catches at the sides of the car whereby the floor may be supported horizontally in operative position and may be held and supported against the roof of the car by means of the link or rod, substantially as described.

2. In a cattle-car having an adjustable supplemental floor, the combination with such car and floor of a crank-rod and a watering trough or bucket mounted upon said crank-rod whereby the same may be adjusted to rest on either floor, substantially as described.

3. In a cattle-car, the combination of an adjustable floor, suspending and guiding rods, suspending-links jointed to hangers from the roof of the car, and interlocking hooks for engaging the swinging ends of the link when swung horizontally to sustain the floor-section, substantially as described.

In testimony whereof I have signed this specification in the presence of two subscribing witnesses.

CHARLIE J. STRAM.

Witnesses:
RALPH R. BROWN,
HUMPHREY ROBERTS.